United States Patent
Sato et al.

(10) Patent No.: US 6,567,455 B1
(45) Date of Patent: May 20, 2003

(54) SEMICONDUCTOR LASER-EXCITED SOLID LASER

(75) Inventors: Shinji Sato, Tokyo (JP); Kyoko Motoike, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/856,305

(22) PCT Filed: Nov. 19, 1998

(86) PCT No.: PCT/JP98/05214

§ 371 (c)(1),
(2), (4) Date: May 21, 2001

(87) PCT Pub. No.: WO00/31841

PCT Pub. Date: Jun. 2, 2000

(51) Int. Cl.[7] .............................................. H01S 3/0941
(52) U.S. Cl. .............................. 372/75; 372/34; 372/35; 372/72
(58) Field of Search ............... 372/75, 72, 34, 372/35; 600/4.73; 356/300, 301, 302

(56) References Cited

U.S. PATENT DOCUMENTS

| | | | | |
|---|---|---|---|---|
| 5,504,762 A | * | 4/1996 | Hutchison | 372/108 |
| 5,506,857 A | | 4/1996 | Meinzer | 372/55 |
| 5,889,808 A | * | 3/1999 | Kojima et al. | 372/34 |
| 6,352,502 B1 | * | 3/2002 | Chaiken et al. | 600/473 |
| 2002/0091322 A1 | * | 7/2002 | Chaiken et al. | 600/476 |

FOREIGN PATENT DOCUMENTS

| | | | |
|---|---|---|---|
| JP | 1-125567 | 8/1989 | H01S/3/094 |
| JP | 2-146781 | 6/1990 | H01S/3/094 |
| JP | 4-2059 | 1/1992 | H01S/3/094 |
| JP | 5-90672 | 4/1993 | H01S/3/094 |
| JP | 9-283828 | 10/1997 | H01S/3/13 |
| JP | 10-294513 | 11/1998 | H01S/3/094 |

* cited by examiner

Primary Examiner—Paul Ip
Assistant Examiner—Dung Nguyen
(74) Attorney, Agent, or Firm—Sughrue Mion, PLLC

(57) ABSTRACT

A semiconductor laser excitation solid laser of the invention has a solid laser medium, a semiconductor laser for exciting the solid laser medium, a spectrometer for detecting a wavelength region of a radiation spectrum of the semiconductor laser for exciting the solid laser medium, computation means such as a comparator for normalizing an area of the detected spectrum detected by the spectrometer and computing an overlap area between the normalized detected spectrum and a normalized absorption spectrum involved in laser excitation of the solid laser medium, and temperature control means for controlling the temperature of the semiconductor laser based on the output from the computation means.

8 Claims, 7 Drawing Sheets

RADIATION SPECTRUM OF A PLURALITY
OF SEMICONDUCTOR LASERS

ABSORPTION SPECTRUM OF Nd: YAG

SEMICONDUCTOR LASER-EXCITED SOLID LASER

TECHNICAL FIELD

This invention relates to a semiconductor laser excitation solid laser and in particular to increasing the efficiency of the solid laser.

BACKGROUND OF THE INVENTION

A semiconductor laser excitation solid laser is available, for example, as shown in JP-A-5-90672. FIGS. 5 and 6 show the configuration of the semiconductor laser excitation solid laser shown in the gazette. Numeral 61 denotes a semiconductor laser, numeral 62 denotes a collimating lens, numeral 63 denotes a focusing lens, numeral 64 denotes a solid laser medium, numeral 65 denotes a mirror, numeral 66 denotes a beam splitter placed between the collimating lens 62 and the focusing lens 63, numeral 67 denotes a reflection-type grating, and numeral 68 denotes a two-channel photodiode. Numerals 71 and 72 denote amplifiers for amplifying output of the two-channel photodiode, numeral 73 denotes a comparator for making a comparison between output magnitudes of the amplifiers, numeral 75 denotes a temperature adjustment circuit, and numeral 76 denotes a Peltier element for controlling the temperature of the semiconductor laser 61.

Next, the operation is as follows: Apart of light emitted from the semiconductor laser 61 for exciting the solid laser medium 64 is guided into the reflection-type grating 67 through the beam splitter 66. The semiconductor laser light spread by the reflection-type grating 67 is detected by the two-channel photodiode 68. The two-channel photodiode 68 comprises two adjacent diodes placed so that the interfacial boundary therebetween becomes the center wavelength of an absorption spectrum of the solid laser medium 64.

If the barycenter of a radiation spectrum of the semiconductor laser 61 shifts from the center of the absorption spectrum, one of two photodiode outputs of the two-channel photodiode exceeds the other. The output difference is compared by the comparator 73 and the current supplied through the temperature adjustment circuit 75 to the Peltier element 76 installed in the semiconductor laser 61 is controlled.

By the way, the excitation wavelength of the solid laser medium 64 has upper and lower limits. For example, the absorption spectrum corresponding to excitation of Nd:YAG is limited in the vicinity of the range of 790 nm to 820 nm as shown in FIG. 7 and particularly shows a complicated structure indicating sharp absorption in 808 nm and having a comparatively low peak in the vicinity of 805 nm.

On the other hand, the semiconductor laser 61 has a feature that its radiation wavelength shifts depending on the temperature of the active layer of the semiconductor laser 61. An AlGaAs/GaAs-family semiconductor laser having a radiation wavelength in the vicinity of 808 nm contains temperature dependency of about 0.2 to 0.3 nm/° C.; the higher the temperature, the longer wavelength side the radiation wavelength shifting. The radiation spectral width is 2 to 3 nm. Therefore, the configuration as described above is constructed, whereby feedback control with the target wavelength as the center can be performed for the radiation wavelength of the semiconductor laser 61.

However, the absorption spectrum of the solid laser medium is complicated and the radiation spectrum of a semiconductor laser is too narrow to cover all the absorption spectrum of the solid laser medium, thus sufficient excitation efficiency cannot be provided simply by controlling the radiation wavelength of the semiconductor laser based only on the center wavelength or the peak wavelength of the absorption spectrum; this is a problem.

With a laser for generating high power or a laser requiring high-quality beam, a plurality of semiconductor lasers are used for excitation. This is because one semiconductor laser cannot provide sufficient excitation power and one solid laser medium needs to be excited uniformly from multiple directions.

To use a plurality of semiconductor lasers, variations in characteristics from one semiconductor laser to another introduce a problem. The characteristics of temperature dependency of radiation wavelength spectrum and wavelength vary from one semiconductor laser to another. The characteristics change with time. Therefore, to perform temperature control of wavelength for each semiconductor laser, a spectroscope and a temperature controller become necessary for each semiconductor laser and inevitably the configuration becomes complicated; this is a problem.

It is an object of the invention to provide a semiconductor laser excitation solid laser for solving the above-described problems and increasing the excitation efficiency of the semiconductor laser excitation solid laser according to a simple configuration.

SUMMARY OF THE INVENTION

According to the invention, there is provided a semiconductor laser excitation solid laser comprising a solid laser medium, a semiconductor laser for exciting the solid laser medium, a spectrometer for detecting a wavelength region of a radiation spectrum of the semiconductor laser for exciting the solid laser medium, computation means for normalizing an area of the detected spectrum detected by the spectrometer and computing an overlap area between the normalized detected spectrum and a normalized absorption spectrum involved in laser excitation of the solid laser medium, and temperature control means for controlling the temperature of the semiconductor laser based on the output from the computation means.

Therefore, control based on the areas of the wavelength regions of the absorption spectrum of the solid laser medium and the detected spectrum from the semiconductor laser rather than control based only on the center wavelength or the peak wavelength of a spectrum is performed, whereby a semiconductor laser excitation solid laser of high excitation efficiency making the most of any other absorption spectrum region than the center wavelength or the peak wavelength of the spectrum can be provided.

According to the invention, the semiconductor laser excitation solid laser wherein the temperature of the semiconductor laser is controlled so that the overlap area between the detected spectrum and the absorption spectrum reaches the maximum is provided.

Therefore, optimum control for the characteristics of both the solid laser medium and the semiconductor laser can be performed, and the excitation efficiency of the semiconductor laser excitation solid laser can be furthermore increased.

According to the invention, the semiconductor laser excitation solid laser having a plurality of semiconductor lasers, wherein the whole spectrum provided by combining the spectra shown by the semiconductor lasers is detected as the radiation spectrum to be detected is provided.

Therefore, even with the semiconductor laser excitation solid laser comprising a plurality of semiconductor lasers, the whole spectrum provided by combining the spectra shown by the semiconductor lasers is normalized and computed, so that control with good accuracy can be performed and the excitation efficiency of the semiconductor laser excitation solid laser can be increased.

DETAILED DESCRIPTION OF THE INVENTION

A preferred embodiment of the invention will be discussed with reference to the accompanying drawings.

Figure 1:
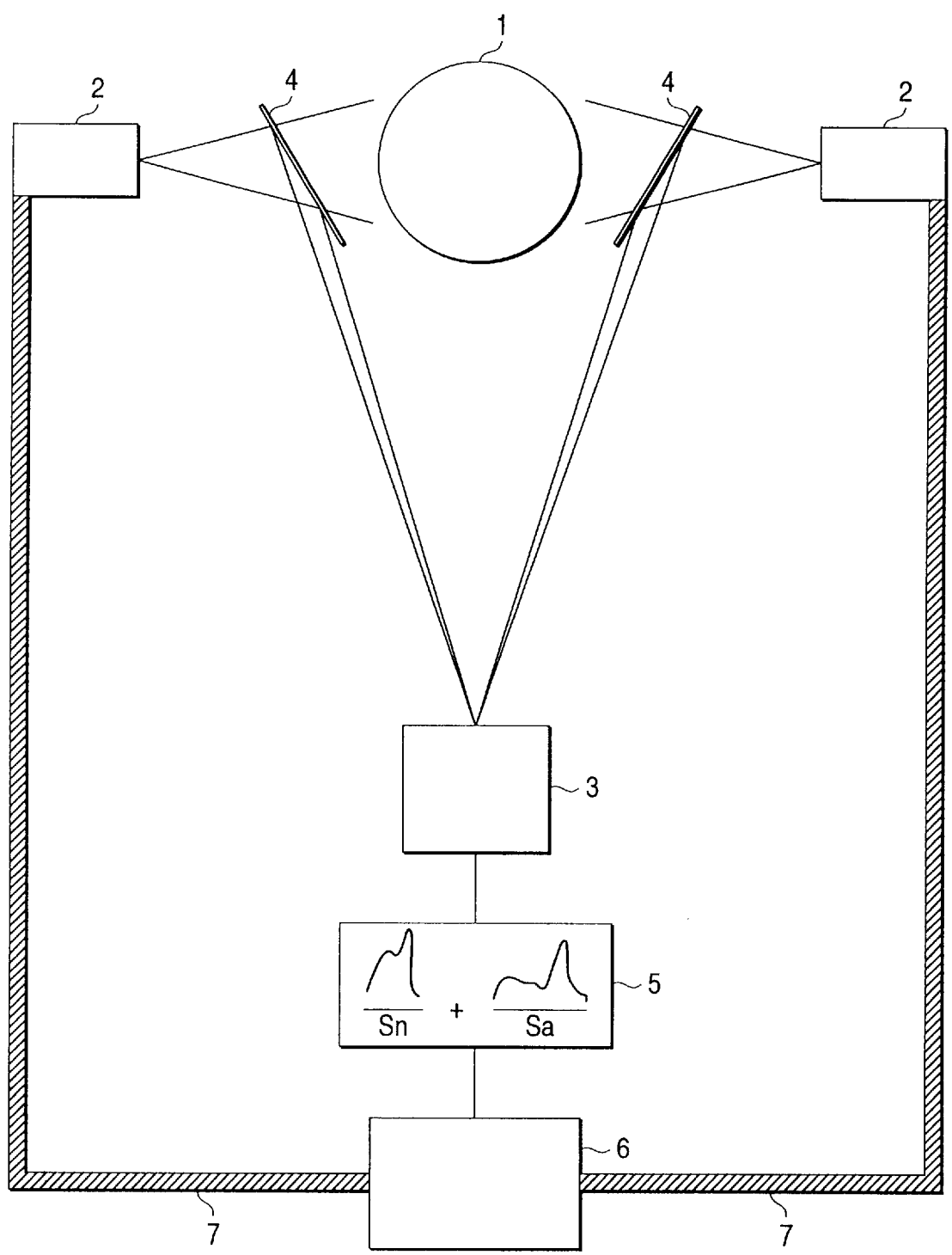
FIG. 1 is a block diagram for side pumping of a semiconductor laser excitation solid laser to show one embodiment of the invention.
Figure 2:
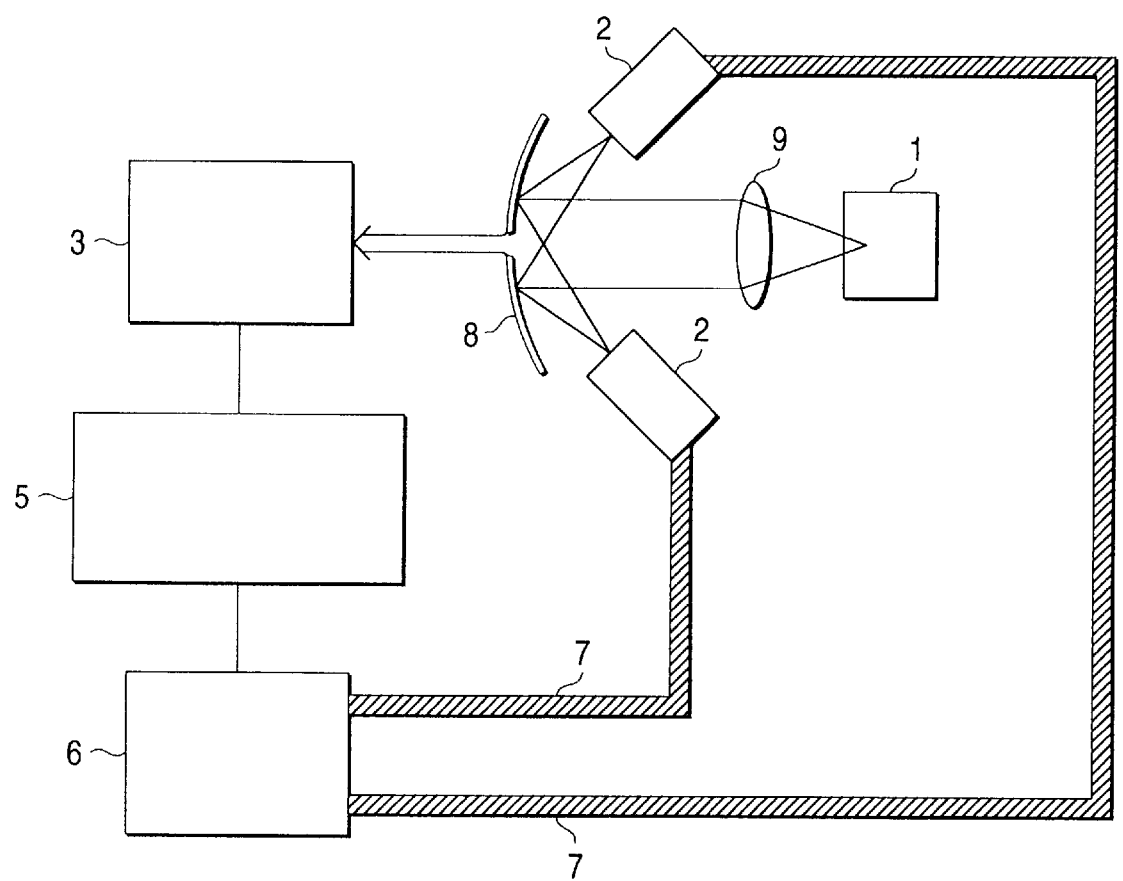
FIG. 2 is a block diagram for end pumping of a semiconductor laser excitation solid laser to show one embodiment of the invention.

FIGS. 1 and 2 show each the configuration of a semiconductor laser excitation solid laser of the invention. FIG. 1 is an example of a block diagram for side pumping and FIG. 2 is an example for end pumping. Numeral 1 denotes a solid laser medium and numeral 2 denotes a semiconductor laser for exciting the solid laser medium 1; in the embodiment, two semiconductor lasers are used. Numeral 3 denotes a spectrometer for detecting the spectrum of a wavelength region involved in excitation of the solid laser medium 1, numeral 4 denotes a beam splitter for taking out a part of light of the corresponding semiconductor laser 2 into the spectrometer 3, numeral 5 denotes a comparator as computation means for comparing the overlap between the spectrum detected by the spectrometer 3 and the absorption spectrum of the solid laser medium 1, numeral 6 denotes a refrigerant circulator as temperature control means having a temperature control function of a refrigerant for cooling the semiconductor lasers 2, numeral 7 denotes a refrigerant supply route for supplying the refrigerant to the semiconductor lasers 2, numeral 8 denotes a reflector for gathering light from the semiconductor lasers 2 on the solid laser medium 1, and numeral 9 denotes a condensing lens.

With the apparatus shown in FIG. 1, a part of light of each semiconductor laser 2 for exciting the solid laser medium 1 is guided through the beam splitter 4 into the spectrometer 3. With the apparatus shown in FIG. 2, a part of light of each semiconductor laser 2 is taken out from a window of the reflector 8 and is guided into the spectrometer 3. The spectrometer 3 detects the spectrum of the whole light emitted from a plurality of semiconductor lasers 2. An absorption spectrum Sa in the area involved in excitation of the solid laser medium 1 is stored in the comparator 5 and is compared with spectrum Sd detected by the spectrometer 3 for controlling the refrigerant temperature of the refrigerant circulator 6. An example of comparison processing between the absorption spectrum Sa and the detected spectrum Sd and temperature control of the semiconductor lasers will be described later.

The refrigerant supplied from t he refrigerant circulator 6 cools the semiconductor lasers 2 at the temperature specified by the comparator 5. Since each semiconductor laser 2 has temperature dependency in the radiation spectrum, radiation is performed in the spectrum at the temperature specified by the comparator 5 for exciting the solid laser medium 1.

Figure 3:
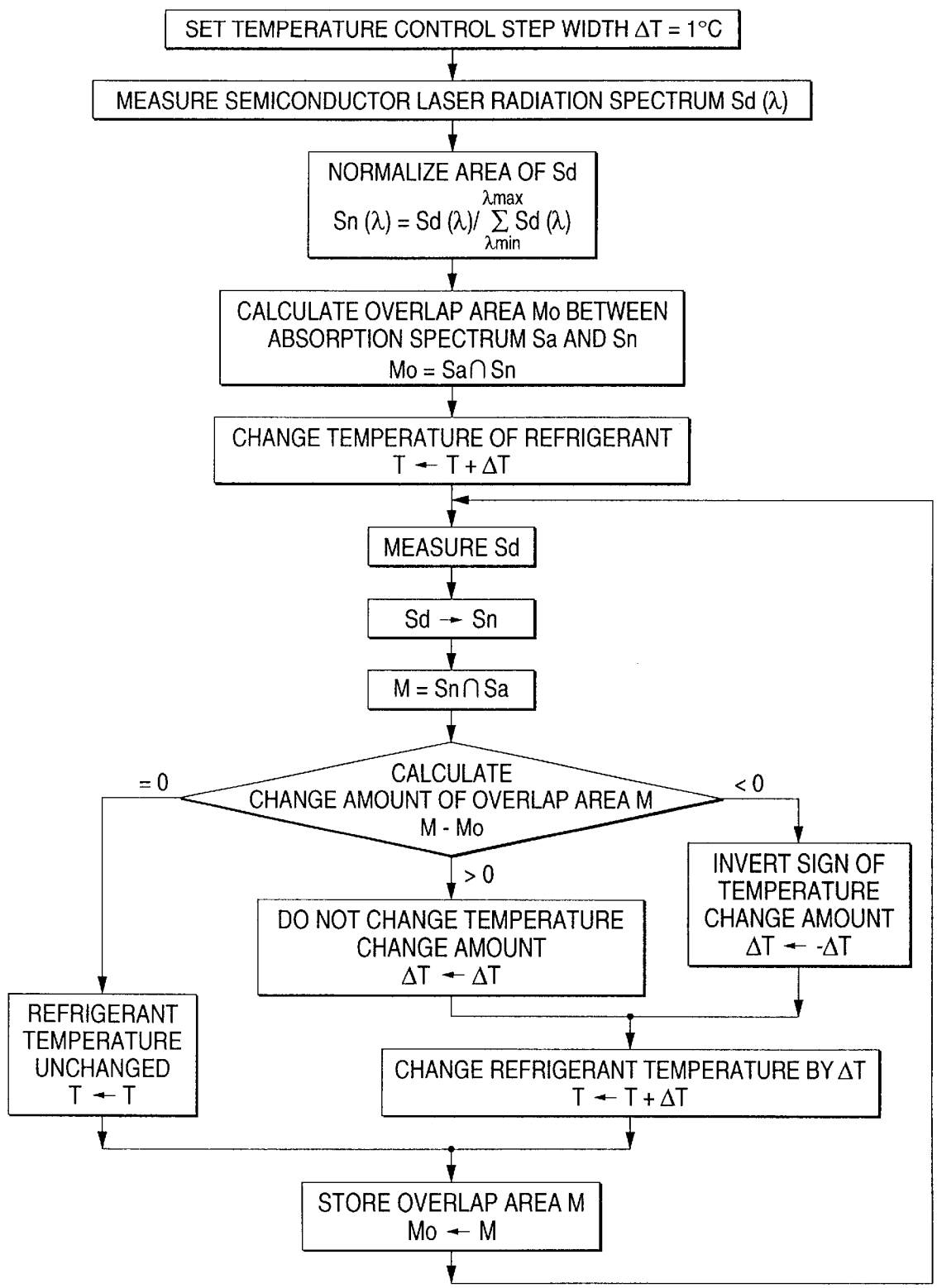
FIG. 3 is a flowchart to show an example of a temperature control method.

An example of comparison processing of the comparator 5 between the absorption spectrum Sa related to excitation of the solid laser medium 1 and the spectrum Sd of radiation from the semiconductor laser 2, detected by the spectrometer 3 and temperature control of the semiconductor lasers 2 will be discussed with FIG. 3.

Figure 4:
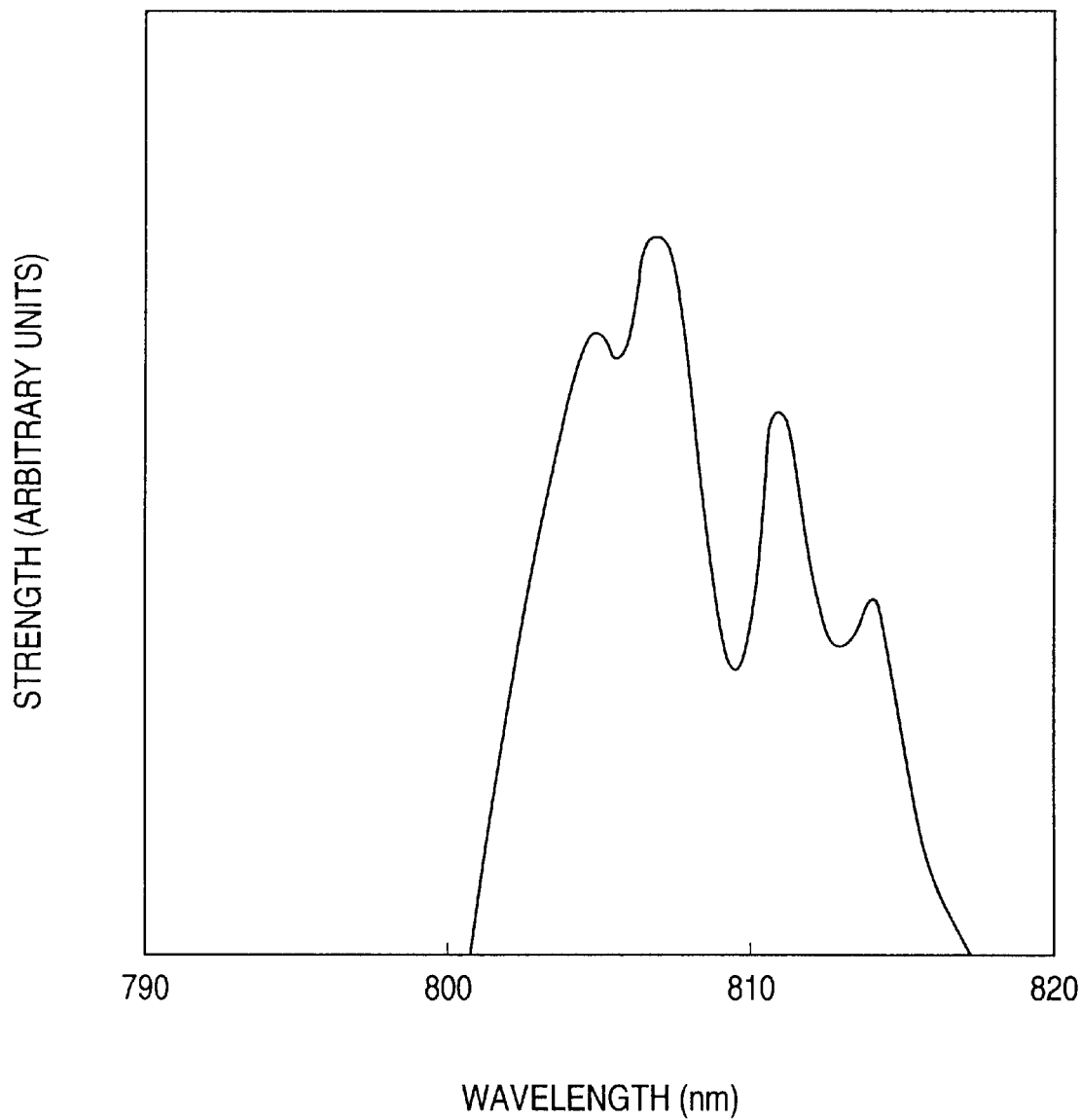
FIG. 4 is a chart to show an example of the radiation spectrum of a plurality of semiconductor lasers.
Figure 5:
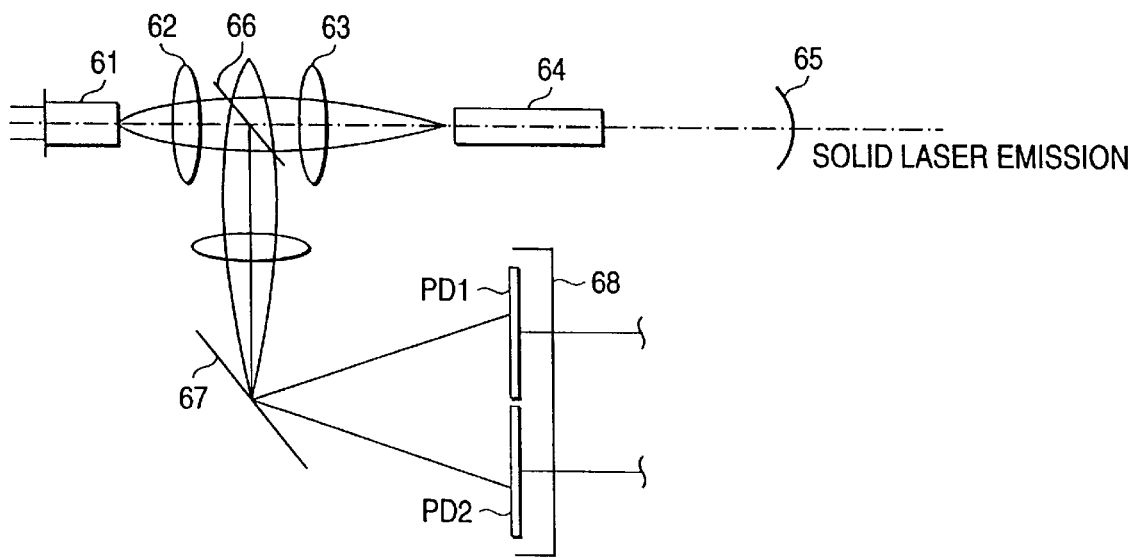
FIG. 5 is a diagram of the configuration of a semiconductor laser excitation solid laser in a related art.
Figure 6:
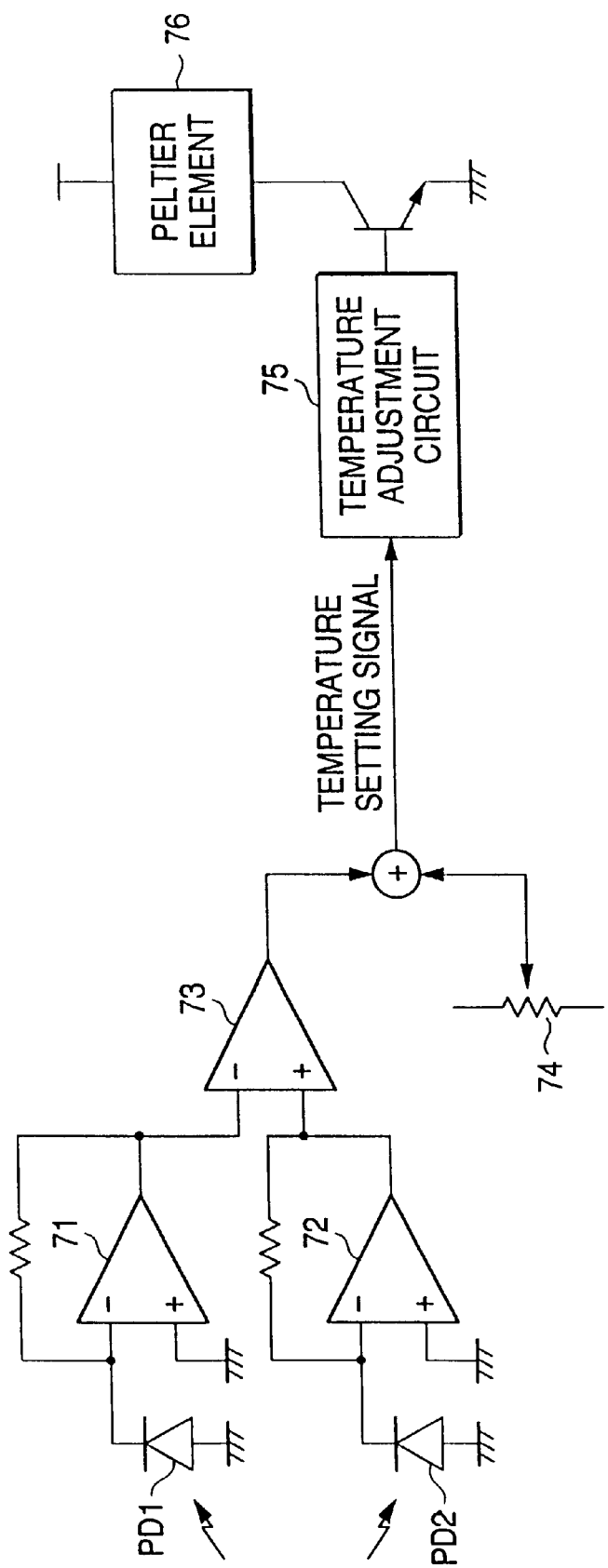
FIG. 6 is a wavelength temperature control circuit diagram of the semiconductor laser excitation solid laser in the related art.
Figure 7:
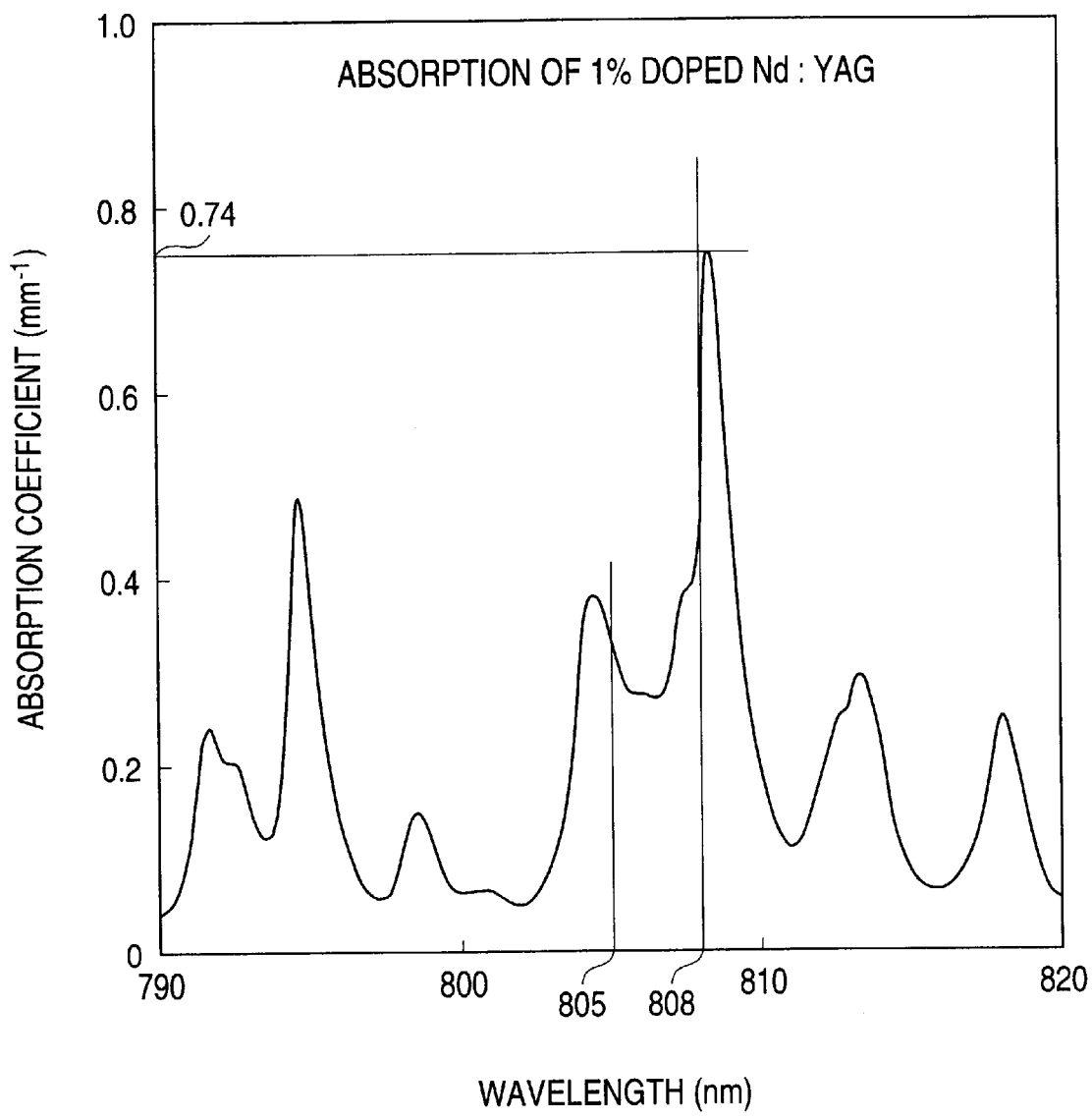
FIG. 7 is a chart to show the absorption spectrum of solid laser medium Nd:YAG.

FIG. 4 shows an example of the whole spectrum of a plurality of semiconductor lasers 2. FIG. 4 shows an example with four semiconductor lasers. Since wavelength dependency varies from one semiconductor laser to another, the spectrum shape changes with the temperature. If the spectrum shape matches the absorption spectrum Sa of the solid laser medium shown in FIG. 7 (FIG. 7 shows the absorption spectrum in YAG), the maximum excitation efficiency can be provided; in fact, however, the spectrum shapes do not completely match. Therefore, the maximum excitation efficiency substantially is provided by controlling so that the overlap between both spectra reaches the maximum.

The semiconductor laser 2 is controlled according to the temperature of the refrigerant supplied from the refrigerant circulator 6. The initial refrigerant temperature set in the refrigerant circulator 6 is the estimated temperature at which the peak wavelength or center wavelength of the radiation spectrum of the semiconductor laser 2 matches that of the absorption spectrum Sa of the solid laser medium 1.

The spectrum Sd as a whole provided by combining the light beams emitted from a plurality of semiconductor lasers 2 is detected by the spectrometer 3. Since the characteristics of the spectra of the light beams emitted from a plurality of semiconductor lasers 2 vary from one semiconductor laser to another, the spectrum Sd detected by the spectrometer 3 shows a form, for example, as shown in FIG. 4. The detected spectrum Sd is converted into a normalized spectrum Sn by the comparator 5 so that the area becomes 1 in the wavelength region involved in excitation of the solid laser medium 1, for example, the wavelength region of 790 nm to 820 nm in YAG.

The absorption spectrum Sa of the solid laser medium 1 is stored in the comparator 5 and is normalized so that the area in the wavelength region involved in excitation becomes 1. In the comparator 5, overlap area M between the normalized spectrum Sn and the absorption spectrum Sa is calculated.

Letting the absorption spectrum normalized in the wavelength region involved in excitation of the solid laser medium ($\lambda min < \lambda < \lambda max$) be $Sa(\lambda)$ and the radiation spectrum of the semiconductor laser normalized in the same wavelength region be $Sn(\lambda)$, the overlap area M can be found from the following expression:

$$M = \sum_{\lambda=\lambda min}^{\lambda max} \min(Sa(\lambda), Sn(\lambda))$$

where the functionmin(x, y) returns the value of x ory, whichever is the smaller.

Next, the refrigerant control temperature in the refrigerant circulator 6 is changed so that it is raised by one constant value, for example, 1° C. After the temperature is changed, the spectrum of the light from the semiconductor laser 2 is again measured and normalized and again the overlap area M with the absorption spectrum Sa is found. If the area M is larger than the previously found value, the refrigerant temperature is raised by the constant value, for example, 1° C. In contrast, if the area M is reduced, the temperature change amount is inverted and the temperature is lowered, for example, by 1° C. If the area M is unchanged, the temperature is not changed.

The temperature of the semiconductor laser 2 is thus controlled, whereby the whole radiation spectrum of the semiconductor lasers is brought close to the absorption spectrum Sa of the solid laser medium 1 for increasing the excitation efficiency.

In the embodiment, the change step of temperature control is 1° C., but any other value may be adopted. However, the wavelength temperature dependency of an AlGaAs-family semiconductor laser used for excitation of the solid laser medium, such as YAG or YLF, generally is about 0.2 to 0.3 nm/° C. and the absorption spectral width is about several nm, thus the change step of temperature control, 1° C., is a proper value.

Various methods of statistically finding the temperature control step from the change amount of the spectrum overlap area M are also possible, but there are variations in spectrum and temperature dependency from one semiconductor laser to another. Further, the characteristics change with time. Thus, calculation becomes complicated and the processing time is prolonged. Therefore, it is realistic to adopt constant temperature change steps.

In the embodiment, the semiconductor laser temperature control with the refrigerant circulator has been described, but the excitation efficiency of the solid laser medium can also be increased by controlling the operation current of a Peltier element or the atmospheric temperature of a semiconductor laser.

Not only a one-chip semiconductor laser, but also an array of semiconductor lasers and a stack of semiconductor lasers for increasing output are available. The semiconductor lasers have variations in characteristic from one chip to another and temperature change causes the spectrum form to change. Therefore, the semiconductor lasers can be handled as a plurality of semiconductors in the invention and the solid laser excitation efficiency can be increased by performing similar control.

As described above, the semiconductor laser excitation solid laser according to the invention is appropriate for use with an industrial laser machining machine, etc., requiring high machining accuracy, for example.

What is claimed is:

1. A semiconductor laser excitation solid laser comprising a solid laser medium, a semiconductor laser for exciting said solid laser medium, a spectrometer for detecting a wavelength region of a radiation spectrum of said semiconductor laser for exciting said solid laser medium, computation means for normalizing an area of the detected spectrum detected by said spectrometer and computing an overlap area between the normalized detected spectrum and a normalized absorption spectrum involved in laser excitation of said solid laser medium, and temperature control means for controlling temperature of said semiconductor laser based on output from said computation means.

2. The semiconductor laser excitation solid laser as claimed in claim 1 wherein the temperature of said semiconductor laser is controlled so that the overlap area between the detected spectrum and the absorption spectrum reaches the maximum.

3. The semiconductor laser excitation solid laser as claimed in claim 1 having a plurality of semiconductor lasers, wherein a whole spectrum provided by combining spectra shown by the semiconductor lasers is detected as the radiation spectrum to be detected.

4. A semiconductor laser excitation solid laser comprising:

a solid laser medium;

a semiconductor laser operable to excite said solid laser medium;

a spectrometer operable to detect a spectrum of said semiconductor laser;

a comparator operable to convert the detected spectrum into a normalized detected spectrum, wherein the comparator is further operable to compute an overlap area between the normalized detected spectrum and a normalized absorption spectrum; and a temperature control circuit operable to control the temperature of said semiconductor laser based on output from said comparator.

5. The semiconductor laser excitation solid laser according to claim 4, wherein the temperature of said semiconductor laser is controlled so that the overlap area between the detected spectrum and the absorption spectrum reaches a maximum.

6. The semiconductor laser excitation solid laser according to claim 4, wherein the spectrum detected by the spectrometer is a whole spectrum provided by combining spectra of a plurality of semiconductor lasers.

7. The semiconductor laser excitation solid laser according to claim 4, wherein, when the comparator computes an increase in the overlap area, the temperature control circuit increases the temperature of the semiconductor laser by a predetermined value.

8. The semiconductor laser excitation solid laser according to claim 7, wherein, when the comparator computes a decrease in the overlap area, the temperature control circuit decreases the temperature of the semiconductor laser by a predetermined value.

* * * * *